US008446551B2

United States Patent
Gu

(10) Patent No.: US 8,446,551 B2
(45) Date of Patent: May 21, 2013

(54) METHOD AND APPARATUS TO REDUCE DIELECTRIC DISCHARGE IN LIQUID CRYSTAL DEVICES DRIVEN WITH HIGH VOLTAGES

(75) Inventor: Dong Feng Gu, Thousand Oaks, CA (US)

(73) Assignee: Teledyne Scientific & Imaging, LLC, Thousand Oaks, CA (US)

( * ) Notice: Subject to any disclaimer, the term of this patent is extended or adjusted under 35 U.S.C. 154(b) by 654 days.

(21) Appl. No.: 11/953,801

(22) Filed: Dec. 10, 2007

(65) Prior Publication Data

US 2009/0147195 A1 Jun. 11, 2009

(51) Int. Cl.
*G02F 1/1333* (2006.01)
*G02F 1/1343* (2006.01)

(52) U.S. Cl.
USPC ........................................... 349/122; 349/139

(58) Field of Classification Search
USPC ........................ 257/59; 438/30; 349/43, 122
See application file for complete search history.

(56) References Cited

U.S. PATENT DOCUMENTS

| 5,529,863 | A  | * | 6/1996  | Swirbel et al. ................... 430/20 |
| 5,552,909 | A  | * | 9/1996  | Onisawa et al. ................. 349/42 |
| 7,218,361 | B2 | * | 5/2007  | Yamazaki et al. ............... 349/43 |
| 7,260,286 | B2 |   | 8/2007  | Gu et al. |
| 7,268,849 | B2 |   | 9/2007  | Gu et al. |
| 2006/0114395 | A1 | * | 6/2006 | Kwon ............................. 349/139 |
| 2008/0007666 | A1 | * | 1/2008 | Takeda et al. .................... 349/43 |
| 2008/0278649 | A1 | * | 11/2008 | Koike et al. ..................... 349/42 |

OTHER PUBLICATIONS

Jim Lux, Rogowski Profiles, May 10, 1998, http://home.earthlink.net/~jimlux/hv/rogowski.htm.*
Ness Engineering Tech Data—Rogowski Profile Electrodes, http://www.nessengr.com/techdata/rogowski/rogowski.html.*

* cited by examiner

*Primary Examiner* — Edward Glick
*Assistant Examiner* — David Chung
(74) *Attorney, Agent, or Firm* — Snell & Wilmer LLP

(57) ABSTRACT

The present invention relates to a method and apparatus to reduce dielectric discharge in liquid crystal cells driven with high voltage. In one embodiment, the present invention is a liquid crystal cell including a substrate with a surface and a tapered conductive film on top of the surface of the substrate including a first end and a second end. In another embodiment, the present invention is a method for forming a liquid crystal cell including covering a portion of a surface of a substrate with a shadow mask and then depositing conductive film onto the surface of the substrate such that the conductive film is tapered.

20 Claims, 5 Drawing Sheets

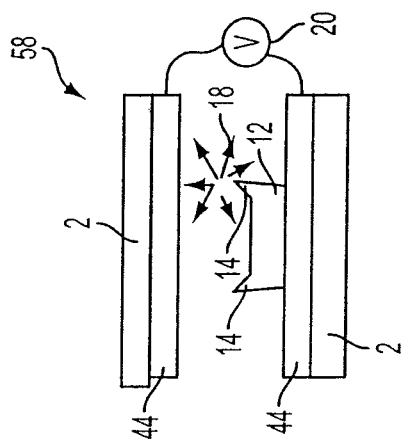
FIG. 1A
PRIOR ART
FIG. 1B
PRIOR ART
FIG. 1C
PRIOR ART
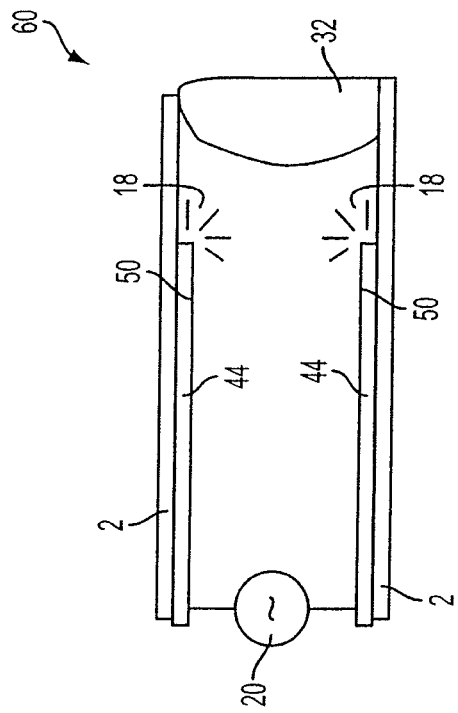
FIG. 3
PRIOR ART
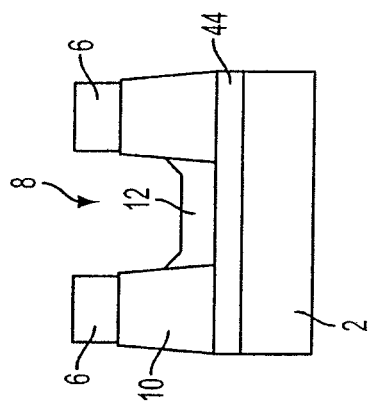
FIG. 2
PRIOR ART

METHOD AND APPARATUS TO REDUCE DIELECTRIC DISCHARGE IN LIQUID CRYSTAL DEVICES DRIVEN WITH HIGH VOLTAGES

BACKGROUND

1. Field

The present invention relates to a method and apparatus to reduce dielectric discharge in liquid crystal cells or devices driven with high voltages.

2. Related Art

As shown in FIGS. 1A-1C, the prior art uses a photolithography process to deposit a gold layer 12 on conventional conductor films 44 inside a large conventional liquid crystal cell 58. Generally, conventional liquid crystal cell 58 comprise a pair of substrates 2 facing each other. Each substrate 2 has a conventional conductive film 44 on top of it on a side of the substrate 2 facing the other substrate 2. Conventional conductive films 44 are connected by a drive signal supply 20 (e.g., a voltage signal generator). On top of each conventional conductive film 44 are polymer-dispersed or cholesteric liquid crystals (not shown), which would require high operation voltage. Drive signal supply voltage 20 is an AC signal generator that supplies the necessary high voltage to drive conventional liquid crystal cell 58.

In liquid crystal devices that contain polymer-dispersed or cholesteric liquid crystal materials, high voltages are necessary to overcome the polymer network elasticity or helical twisting power on the molecular level to tune or switch the device for a desired electro-optical effect. In these liquid crystal cells, electric fields higher than 15 V/µm or voltages higher than 100 volts need to be applied.

However, due to the use of high voltages, conventional liquid crystal cells 58 created through the photolithography process are prone to unwanted dielectric discharges. Dielectric discharges usually trigger a dramatic cascading effect and evaporates a certain amount of liquid crystal material inside a liquid crystal cell. Such dielectric discharges can severely damage the liquid crystal cells and render it inoperable.

In FIG. 1A, a photoresist 10 is etched to create a gap 8. Gold 6 is deposited over photoresist 10 and gold 6 is deposited in gap 8 to form gold layer 12.

In FIG. 1B, after gold 6 and photoresist 10 are removed, gold layer 12 remains on top of conductive film 44. However, when photoresist 10 is removed, "dog ears" or gold sharp tips 14 are left on the edge of gold layer 12. This is problematic, because as shown in FIG. 1C, gold sharp tips 14 can cause a dielectric discharge 18 of conventional liquid crystal cell 58.

As shown in FIG. 2, dielectric discharges 18 can also occur when gold sharp tips 14 break off from gold layer 12 creating conductive particles 16 on top of conventional conductive film 44.

Dielectric discharges 18, however, are not limited to liquid crystal cells with gold layer 12 created through the photolithography process. As shown in FIG. 3, a conventional liquid crystal cell 60 comprises conventional conductive films 44 connected by the drive signal supply voltage 20. Each of the conductive films 44 are positioned on top of the substrate 2. One portion of the substrate 2 is enclosed by a peripheral seal 32. In FIG. 3, dielectric discharges 18 can also occur around the sharp edges of ends 50 of the conductive layer 44.

Furthermore, conventional manufacturing processes for photolithography are also inefficient. FIG. 14 demonstrates a conventional process fabricating single-pixel liquid crystal cells for a pop-up filter with a very high contrast ratio. As shown in FIG. 14, the substrate 2 is manually cleaned one-by-one in step S1400. Then, the conventional conductive film 44 is deposited in step S1402 at the rate of 6 liquid crystal cells being completed per batch. In step S1404, the substrate 2 is manually cleaned one-by-one again. In step S1406, the conductive film 44 is patterned through the photolithography process one-by-one. In step 1408, the substrate 2 is again cleaned manually one-by-one. Then, in step S1410, a gold ring such as gold layer 12 is deposited with approximately 24 liquid crystal cells being completed per batch. Then, the substrate 2 is cleaned manually one-by-one in step S1412. Anti-reflective coating is then performed at approximately 36 liquid crystal cells per batch in step S1414. As shown in FIG. 14, the conventional manufacturing process can be inefficient. Furthermore, such a process is also unclean.

Thus, there is a need for a liquid crystal cell which is more resistant to dielectric discharges. There is also a need for a manufacturing process of liquid crystal cells which is more efficient.

SUMMARY

In one embodiment, the present invention is a liquid crystal cell including a substrate with a surface and a tapered conductive film on top of the surface of the substrate including a first end and a second end.

In another embodiment, the present invention is a method for forming a liquid crystal cell including covering a portion of a surface of a substrate with a shadow mask and then depositing conductive film onto the surface of the substrate such that the conductive film is tapered.

BRIEF DESCRIPTION OF THE DRAWINGS

The features, objects, and advantages of the present invention will become more apparent from the detailed description set forth below when taken in conjunction with the drawings, wherein:

FIGS. 1A-1C are side views of the prior art.

FIG. 2 is a side view of the prior art.

FIG. 3 is a side view of the prior art.

DETAILED DESCRIPTION

Methods and systems that implement the embodiments of the various features of the present invention will now be described with reference to the drawings. The drawings and the associated descriptions are provided to illustrate embodiments of the present invention and not to limit the scope of the present invention. Reference in the specification to "one embodiment" or "an embodiment" is intended to indicate that a particular feature, structure, or characteristic described in connection with the embodiment is included in at least an embodiment of the present invention. The appearances of the phrase "in one embodiment" or "an embodiment" in various places in the specification are not necessarily all referring to the same embodiment. Throughout the drawings, reference numbers are re-used to indicate correspondence between referenced elements. In addition, the first digit of each reference number indicates the figure in which the element first appears.

The present invention results from a discovery that most of the dielectric discharge occurred near the edge of the conductive films where the electric field was the strongest, due to the fringe field effect that results from a sharp curvature on the conductive film edge. Thus, one object of the present invention is to reduce the electric field near the edge of the conductive films so that the occurrence of dielectric discharges can be substantially reduced. Another object of the present invention is to manufacture liquid crystal cells in a more efficient and clean manner. There are applications which require a uniform electric field between two electrodes such as in a high voltage-driven liquid crystal cell and in dielectric material break-down voltage testing. Finite-sized electrodes produce a uniform field at the middle of the electrode plate, but the high electric field formed at the edges creates a problem. A conventional technique developed by Rogowski et al. starts by determining a realizable field and then constructing an electrode shaped so that the surface of the electrode lies on an equal-potential surface. This technique starts with an analytical solution of the field due to a finite plane plate parallel to an infinite plane. The solution is to construct electrodes that follow an equal-potential surface which is some distance from the flat plate electrode. Since it is further away, the field strength is lower, and the breakdown occurrence is substantially reduced.

Figure 4:
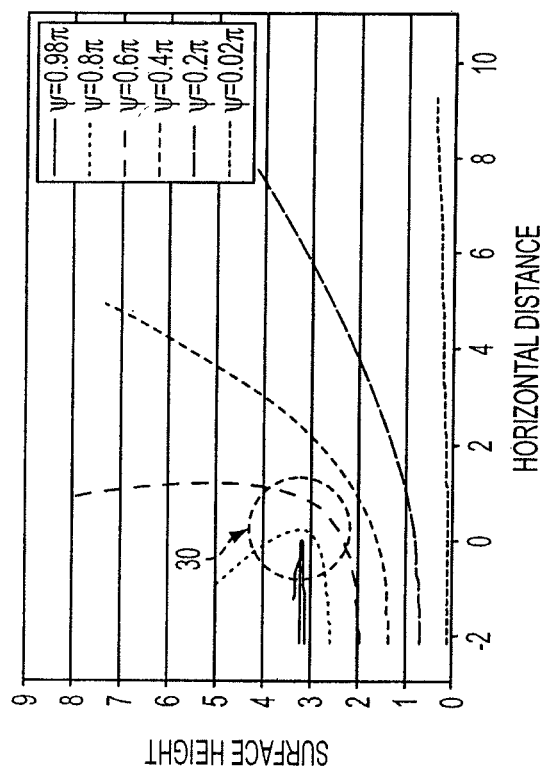
FIG. 4 is a chart of characteristics of Rogowski profiles of an embodiment of the present invention.

FIG. 4 depicts a chart of the electric field of an edge of a first capacitor plate as a function of horizontal distance and surface height from a second capacitor plate for several Rogowski profiles. The first capacitor plate is a semi-infinite capacitor plate and the second capacitor plate is an infinite capacitor plate. The first capacitor plate and the second capacitor plate combine to form a capacitor. As shown in FIG. 4, the second capacitor plate is located at surface height 0. The edge of the first capacitor plate is located at approximately height 3.1 and horizontal distance 0. The Rogowski profiles are thus used to describe the equal potential lines near the edge of a first capacitor plate and each $\psi$ represents a contour line.

Figure 5:
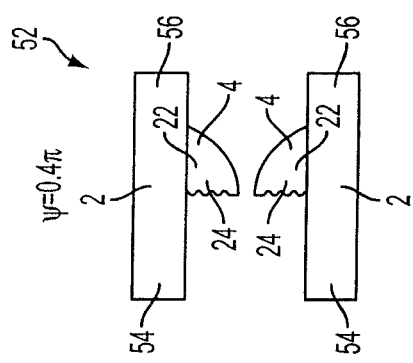
FIG. 5 is a side of view of an embodiment of the present invention.
Figure 7:
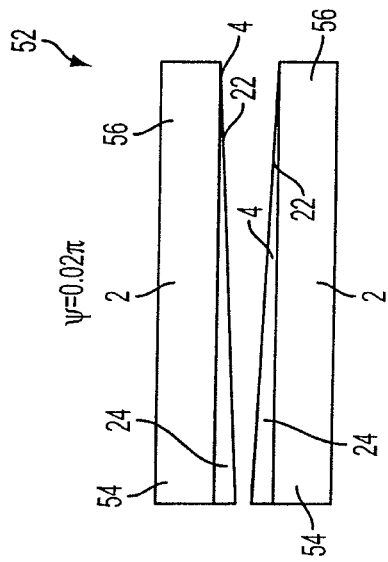
FIG. 7 is a side view of an alternate embodiment of the present invention.
Figure 6:
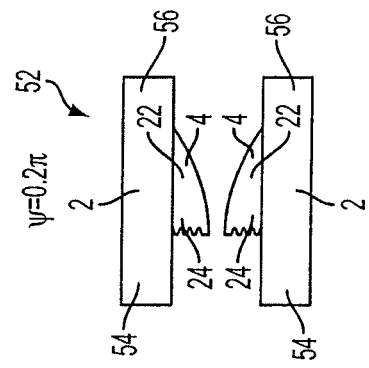
FIG. 6 is a side of view of an alternate embodiment of the present invention.

The conductive film of the liquid crystal cell is the first capacitor plate in the present invention. Notably in section 30 near the edge of the capacitor, there is a high field at a semi-infinite capacitor edge. FIG. 5 depicts liquid crystal cell 52 with a Rogowski profile of approximately $\psi=0.4\pi$, while FIG. 6 depicts liquid crystal cell 52 with a Rogowski profile of approximately $\psi=0.2\pi$, and FIG. 7 depicts liquid crystal cell 52 a Rogowski profile of approximately $\psi=0.02\pi$. It is contemplated that if the first capacitor plate or the conductive film in the liquid crystal cell in FIG. 4 uses a Rogowski profile of $\psi<0.5\pi$, the fringe field near the edge of the first capacitor plate, as indicated by the circle 30, would be less than or equal to the field strength inside the capacitor. Therefore, it would be less likely that a dielectric discharge would occur near the edge of the first capacitor plate or the conductive film.

As the $\psi$ is reduced in the Rogowski profile, the distance between the substrates 2 can be reduced since the curved profile of the conductive film 4 is reduced. That is, the curved profile begins to approximate a linear profile. Preferably, the present invention should have a Rogowski profile of approximately $\psi=0.02\pi$ or lower so that the distance between the substrates 2 is small enough for the liquid crystal cell to perform adequately. As seen in FIG. 7, when the $\psi=0.02\pi$ or lower, the curved profile could approximate a linear profile. In one embodiment, it is contemplated that the $\psi$ could be $0.00002\pi$ or lower. Thus, the present invention can mimic or approximate the Rogowski profile using very small $\psi$ values, by creating an attenuating AC field, which is described in the following sections.

In FIGS. 5, 6, and 7, liquid crystal cell 52 includes conductive film 4 with a Rogowski profile on a side of each substrate 2. First end 22 is thinner than second end 24 of tapered conductive film 4. Thus, conductive film 4 is tapered at an end of substrate 2. By utilizing a conductive film 4 with one or more of the ends tapered, the likelihood of a dielectric discharge is reduced. Second end 24 in FIGS. 5, 6, and 7 is shown only for illustrative purpose since second end 24 is continuing towards the left direction and requires more conductive materials for higher $\psi$ values.

Although in FIGS. 5, 6, and 7, only one end of the conductive film 4 is tapered, it is contemplated that both ends of the conductive film 4 can be tapered with a portion in the middle of the conductive film 4 having a substantially uniform height. Furthermore, in FIGS. 5 and 6, the tapered portion of the conductive film 4 which is first end 22 has a curved profile and thus has a curved tapering. However, in FIG. 7, the tapered portion of conductive film 4 which is first end 22 has a profile substantially linear tapering and it requires less conductive material for the liquid crystal, as compared with the conductive films 4 in FIGS. 5 and 6.

Figure 8:
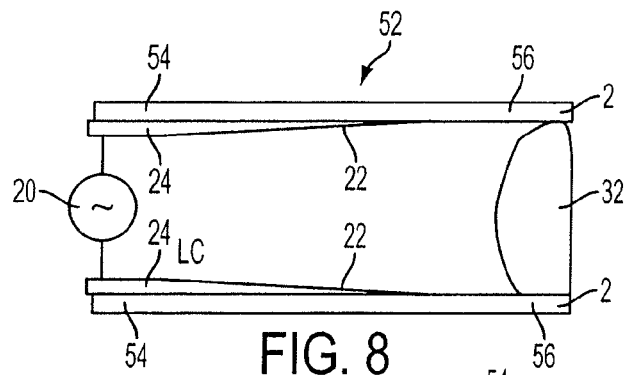
FIG. 8 is a side view of an alternate embodiment of the present invention.

FIG. 8 depicts another embodiment of the present invention. In one embodiment, an end of liquid crystal cell 52 includes a pair of glass substrates 2 with a peripheral seal 32 on one end of glass substrates 2. Glass substrates 2 have a first end 56 and a second end 54. Although not shown, second end 54 may extend further towards the left. It is contemplated that glass substrates 2 can be composed of other material suitable for a liquid crystal cell and are not limited to just glass. Each of the pair of glass substrates 2 includes a tapered conductive film 4 with a first end 22 thinner than a second end 24. In one embodiment, the second end 24 of tapered conductive film 4 is located at second end 54 of glass substrate 2. The first end 22 of tapered conductive film 4 does not need to be located at the first end 56 of the glass substrate 2 but instead can be located anywhere along the glass substrate 2. The tapered conductive films 4 are connected by the voltage signal generator 20 which supplies voltage to tapered conductive films 4.

The tapered conductive films 4 can be comprised of transparent conductor films such as Transcon™ with a finite resistivity. The transparent conductor film can be comprised of ZnO, but it can also be comprised of ITO or other conductive materials that can be vacuum-deposited. The finite resistivity can be, for example, several hundred Ohm/in². In one embodiment, the resistivity is between about 10 Ohm/in² and 1000 Ohm/in². In another embodiment, the resistivity is between about 100 Ohm/in² and 300 Ohm/in². The appropriate resistivity can be determined by the aperture/pixel size, drive frequency, and voltage uniformity requirements within the aperture for the liquid crystal cell. Under an AC electric field, the first end 22 of tapered conductive film 4 with a high resistivity creates a diminishing electric field near the first end 22 since the fringe electric strength at the first end 22 is lower than that inside the liquid crystal cell. Thus, the liquid crystal cell would be more reliable when subject to high voltages.

Furthermore, it would be advantageous to have transparent conductor films since the liquid crystal cell would be part of a display panel. Use of a transparent conductor film may be beneficial for efficient illumination in a display panel by reducing the amount of light absorbed or blocked by tapered conductive films 4.

Thus, using tapered conductive film 4 with very small gradient, or ψ values is advantageous because it may (a) reduce the likelihood of a dielectric discharge; (b) reduce the optical absorption in a liquid crystal cell; and (c) be less expensive than using thicker conductive film 4.

Figure 9:
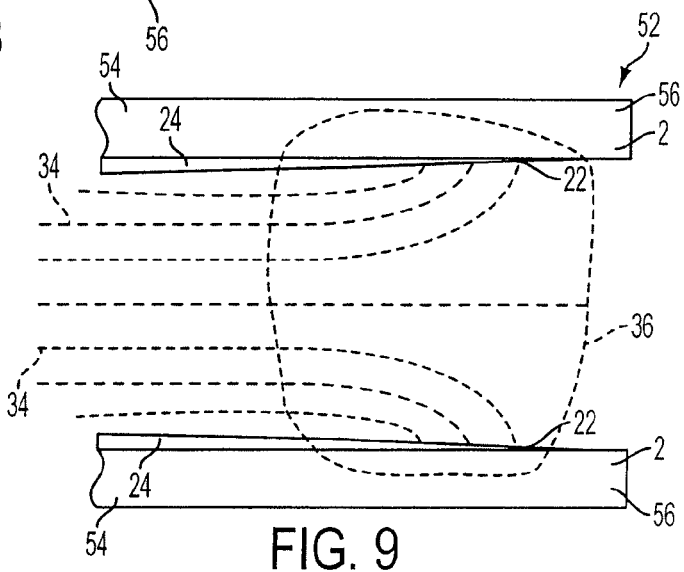
FIG. 9 is a side view of an alternate embodiment of the present invention.

FIG. 9 is a close-up of a portion liquid crystal cell 52 as depicted in FIG. 8. When liquid crystal cell 52 is activated, equal potential lines 34 indicate that the electric field is weaker at the first end 22 since the first end 22 does not have a sharp edge. Thus, there is a reduced likelihood of a dielectric discharge.

Figure 10:
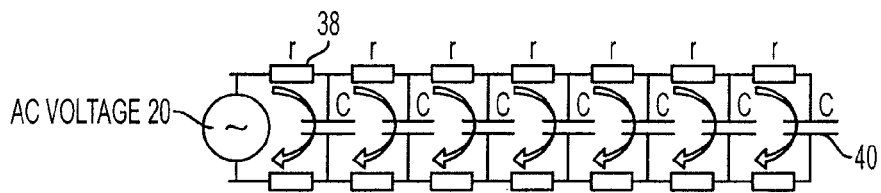
FIG. 10 is a schematic diagram of an equivalent circuit of an alternate embodiment of the present invention.

FIG. 10 is a schematic diagram of an equivalent circuit of the liquid crystal cell from section 36 in FIG. 9. As shown, the equivalent circuit from section 36 includes voltage signal generator 20 connected to a plurality of resistors 38 and a plurality of capacitors 40.

Figure 11:
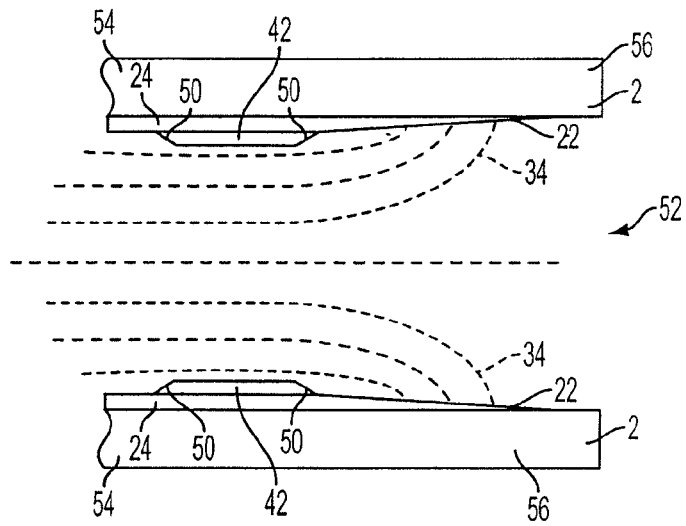
FIG. 11 is a side view of an alternate embodiment of the present invention.

FIG. 11 is a close-up of an alternate embodiment of liquid crystal cell 52. In FIG. 11, liquid crystal cell 52 further includes gold layers 42 in addition to the components depicted in FIG. 9. Each gold layer 42 is located on a portion of tapered conductive film 4. It is contemplated that gold layer 42 can have tapered portions 50 at a first end of the gold layer and at a second end of the gold layer. It is also contemplated that gold layer 42 can be a gold ring with the gold ring having tapered portions 50 at its outer edge. It is contemplated that gold layer 42 can reduce the conductivity requirement for conductive film 4 and therefore reduces the optical absorption and material cost.

Figure 12:
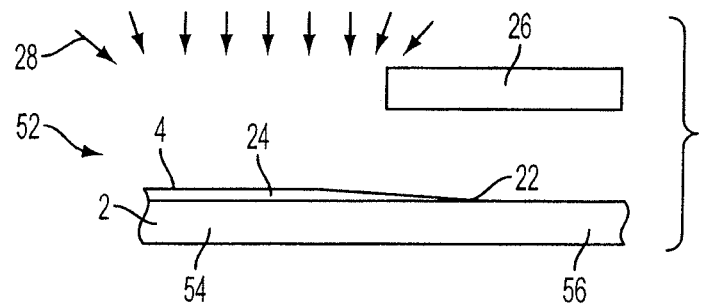
FIG. 12 depicts a method for creating a liquid crystal cell of an embodiment of the present invention.

FIG. 12 depicts a method for producing a tapered conductive film edge on a liquid crystal cell substrate. To place the tapered conductive film 4 on substrate 2, a shadow mask 26 is used. Shadow mask 26 is placed above a portion of substrate 2. Vapor source 28 then deposits particles of tapered conductive film 4 onto substrate 2. By using shadow mask 26, first end 22 can be created such that it is thinner than second end 24. That is because of the shielding by shadow mask 26, more material of tapered conductive film 4 is deposited outside of the area of substrate 2 directly below shadow mask 26 than under the area of substrate 2 directly below shadow mask 26. This allows a tapered conductive film 4 to be formed with a tapered portion at first end 22.

Figure 13:
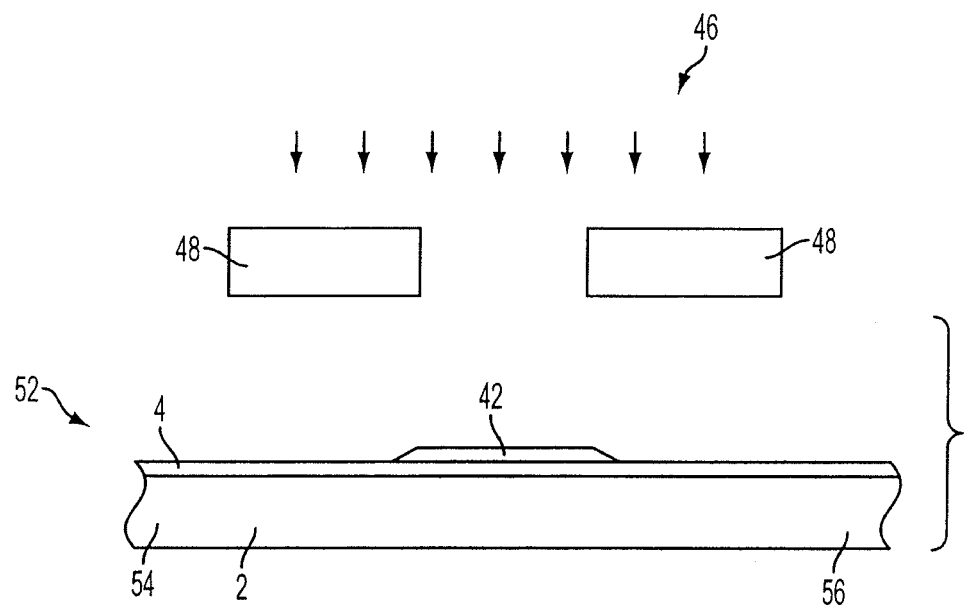
FIG. 13 depicts a method for creating a liquid crystal cell of an embodiment of the present invention.

FIG. 13 depicts a method for preparing a gold ring in a liquid crystal cell. To add gold layer 42 on top of a portion of tapered conductive film 4, mechanical masks 48 are placed above portions of the conductive film 4. Vapor source 46 then deposits material of gold layer 42 onto the conductive film 4. By using mechanical masks 48, gold layer 42 can be tapered at its ends. Because of the shielding by mechanical masks 48, more material of gold layer 42 are deposited outside of the area of tapered conductive film 4 directly below mechanical masks 48. This allows gold layer 42 to be formed with two tapered ends. Although two ends of gold layer 42 are tapered in FIG. 13, it is contemplated that only one end of gold layer 42 could be tapered.

Figure 15:
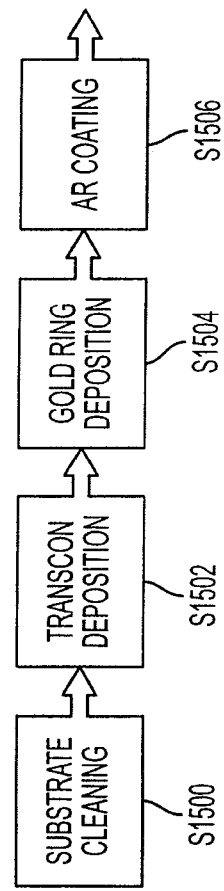
FIG. 15 is a flow chart of an embodiment of the present invention.

FIG. 15 is a flow chart illustrating the manufacturing of a liquid crystal cell. In step S1500, substrate 2 is cleaned. In step S1502, tapered conductive film 4 such as Transcon™ is deposited on substrate 2. Optionally, in step S1504, gold is deposited on tapered conductive film 4 to form a gold layer 42 with 0, 1 or 2 tapered ends. Optionally, in step S1506, an anti-reflective coating is placed on the liquid crystal cell.

Figure 14:
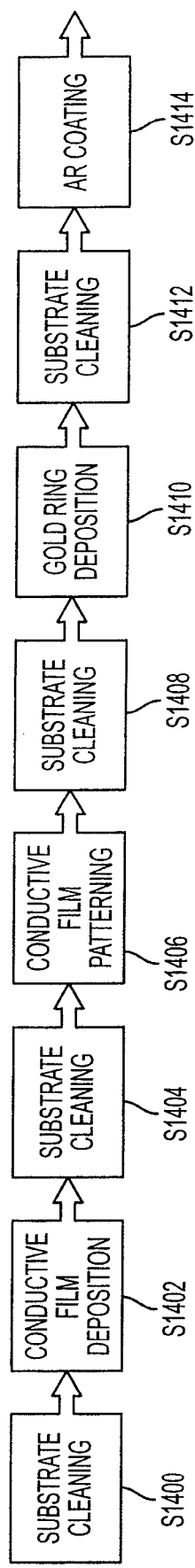
FIG. 14 is a flow chart of the prior art.

When compared with FIG. 14 of the conventional methods for manufacturing a liquid crystal cell, the present invention requires less steps, allows more batch processing, and less manual one-by-one processing. Furthermore, the reliability tests can be curtailed since it may not be necessary to apply test voltage substantially higher than the operating voltage for extended period of time to each liquid crystal cell, in order to identify or "weed out" weak liquid crystal cells. This is because under the current process shown in FIG. 14, there can be a higher yield in acceptable liquid crystal cells. Furthermore, the steps shown in FIG. 14 can improve the cleanliness in the manufacturing process. This can reduce the amount of resources required to manufacture a liquid crystal cell and improve the efficiency of the process.

It is contemplated that the liquid crystal cells of the present invention can be used for a variety of purposes including but not limited to billboards, commercial displays, large signs, light shutters, agile filters or any other displays/devices which require large voltages or intense electric field to operate.

What is claimed is:

1. A method for forming a liquid crystal cell comprising:
    covering a portion of a surface of a substrate with a shadow mask;
    depositing a substantially transparent conductive film onto the surface of the substrate such that the conductive film is tapered at a first end and a second end;
    placing a first mechanical mask covering a first portion of the conductive film and a second mechanical mask covering a second portion of the conductive film; and
    depositing a gold layer on top of the conductive film such that the gold layer is tapered at a first end of the gold layer and at a second end of the gold layer.

2. The method of claim 1 wherein the first portion of the conductive film is tapered with a substantially linear profile.

3. The method of claim 1 wherein the conductive film includes a substantially uniform portion with a substantially uniform height positioned between the first portion of the conductive film and the second end of the conductive film.

4. The method of claim 1 further comprising:
    providing a second substrate having a surface;
    covering a portion of the surface of the second substrate with a second shadow mask; and
    depositing a second conductive film onto the surface of the second substrate such that the second conductive film is tapered at a first end and a second end of the second conductive film, 5. The method of claim 4 further comprising:
    placing a third mechanical mask covering a first portion of the second conductive film and a fourth mechanical mask covering a second portion of the second conductive film; and
    depositing a metal layer on top of the second conductive film such that the metal layer is tapered at a first end and a second end of the metal layer.

6. A method for forming a liquid crystal cell comprising:
    providing a first substrate having a top surface which includes a first portion;
    providing a first shadow mask having a top surface and a bottom surface defining a thickness therebetween;
    positioning the first shadow mask above the first portion of the top surface of the first substrate such that the first shadow mask is spaced apart from the top surface of the first substrate by a first masking distance which is greater than the thickness of the first shadow mask; and depositing, on the top surface of the first substrate, a first conductive film to produce a first tapered end, a second end, a plurality of thicknesses and a first tapered portion which has a length defined along the top surface of the first substrate and includes the first tapered end of the first conductive film, wherein the length of the first tapered portion of the first conductive film is greater than the greatest thickness of the plurality of thicknesses of the first conductive film, the first tapered portion of the first conductive film is tapered with a substantially linear profile, and the first tapered portion of the first conductive film reduces an alternating current dielectric discharge in the liquid crystal cell.

7. The method of claim 6 wherein the second end of the first conductive film is tapered, and the first conductive film further includes a substantially uniform portion with a substantially uniform height between the first tapered portion and the second end of the first conductive film.

8. The method of claim 6 wherein a finite resistivity of the first conductive film to an alternating current or voltage in the liquid crystal cell is greater than 100 Ohm/in$^2$.

9. The method of claim 6 wherein the liquid crystal cell further includes a second conductive film and a liquid crystal cell gap which is defined as a distance between the first and the second conductive films, such that the length of the first tapered portion of the first conductive film is at least ten times greater than the liquid crystal cell gap.

10. The method of claim 6 further comprising:
positioning a first mechanical mask above the first end of the first conductive film; and
depositing, on top of the first conductive film, a first metal layer having a first end and a second end such that the first metal layer tapers at the first end of the first metal layer.

11. The method of claim 10 further comprising:
positioning a second mechanical mask above the second end of the first conductive film such that the first metal layer tapers at the second end of the first metal layer.

12. The method of claim 6 further comprising:
providing a second substrate having a top surface which includes a first portion;
providing a second shadow mask having a top surface and a bottom surface defining a thickness of the second shadow mask therebetween;
positioning the second shadow mask above the first portion of the top surface of the second substrate such that the second shadow mask is spaced apart from the top surface of the second substrate by a second masking distance which is greater than the thickness of the second shadow mask; and
depositing, on the top surface of the second substrate, a second conductive film to produce a first tapered end, a second end, a plurality of thicknesses and a first tapered portion which has a length defined along the first portion of the top surface of the second substrate and includes the first tapered end of the second conductive film,
wherein the length of the first tapered portion of the second conductive film is greater than the greatest thickness of the plurality of thicknesses of the first tapered portion of the second conductive film, the first tapered portion of the second conductive film is tapered with a substantially linear profile, and the first tapered portion of the second conductive film reduces the alternating current dielectric discharge in the liquid crystal cell.

13. The method of claim 12 further comprising;
positioning a third mechanical mask above the first end of the second conductive film and a fourth mechanical mask above the second end of the second conductive film; and
depositing a second metal layer on the second conductive film such that the second metal layer is tapered at a first end and a second end of the second metal layer.

14. The method of claim 13 wherein the first and the second metal layers face each other to form a space therebetween.

15. A liquid crystal cell comprising:
a first substrate having a top surface which includes a first portion; and
a first conductive film having a first tapered end, a second end, a plurality of thicknesses and a first tapered portion which has a length defined along the first portion of the top surface of the first substrate and includes the first tapered end of the first conductive film,
wherein the length of the first tapered portion is greater than the greatest thickness of the plurality of thicknesses of the first conductive film, the first tapered portion of the first conductive film is tapered with a substantially linear profile, and the first tapered portion of the first conductive film reduces an alternating current dielectric discharge in the liquid crystal cell.

16. The liquid crystal cell of claim 15 further comprising:
a second substrate having a top surface which includes a first portion; and
a second, conductive film having a first tapered end, a second end, a plurality of thicknesses and a first tapered portion which has a length defined along the first portion of the top surface of the second substrate,
wherein the length of the first tapered portion of the second conductive film is greater than the greatest thickness of the plurality of thicknesses of the second conductive film, the first tapered portion of the second conductive film is tapered with a substantially linear profile, and the first tapered portion of the second conductive film reduces the alternating current dielectric discharge in the liquid crystal cell.

17. The liquid crystal cell of claim 16 further comprising:
a first metal layer having a first tapered end and being formed on the first conductive film.

18. The liquid crystal cell of claim 17 further comprising:
a second metal layer having a first tapered and being formed on the second conductive film.

19. The liquid crystal cell of claim 18 Wherein the first metal layer further includes a second tapered end, and the second metal layer further includes a second tapered end.

20. The liquid crystal cell of claim 16 further comprising:
a liquid crystal cell gap defined as a distance between the first and the second conductive films, wherein the length of the first tapered portion of the first conductive film is at least ten times greater than the liquid crystal cell gap.

* * * * *